May 6, 1941.  T. M. HUNTER  2,241,015
ROTARY WELDING TRANSFORMER
Filed May 17, 1939  4 Sheets-Sheet 3
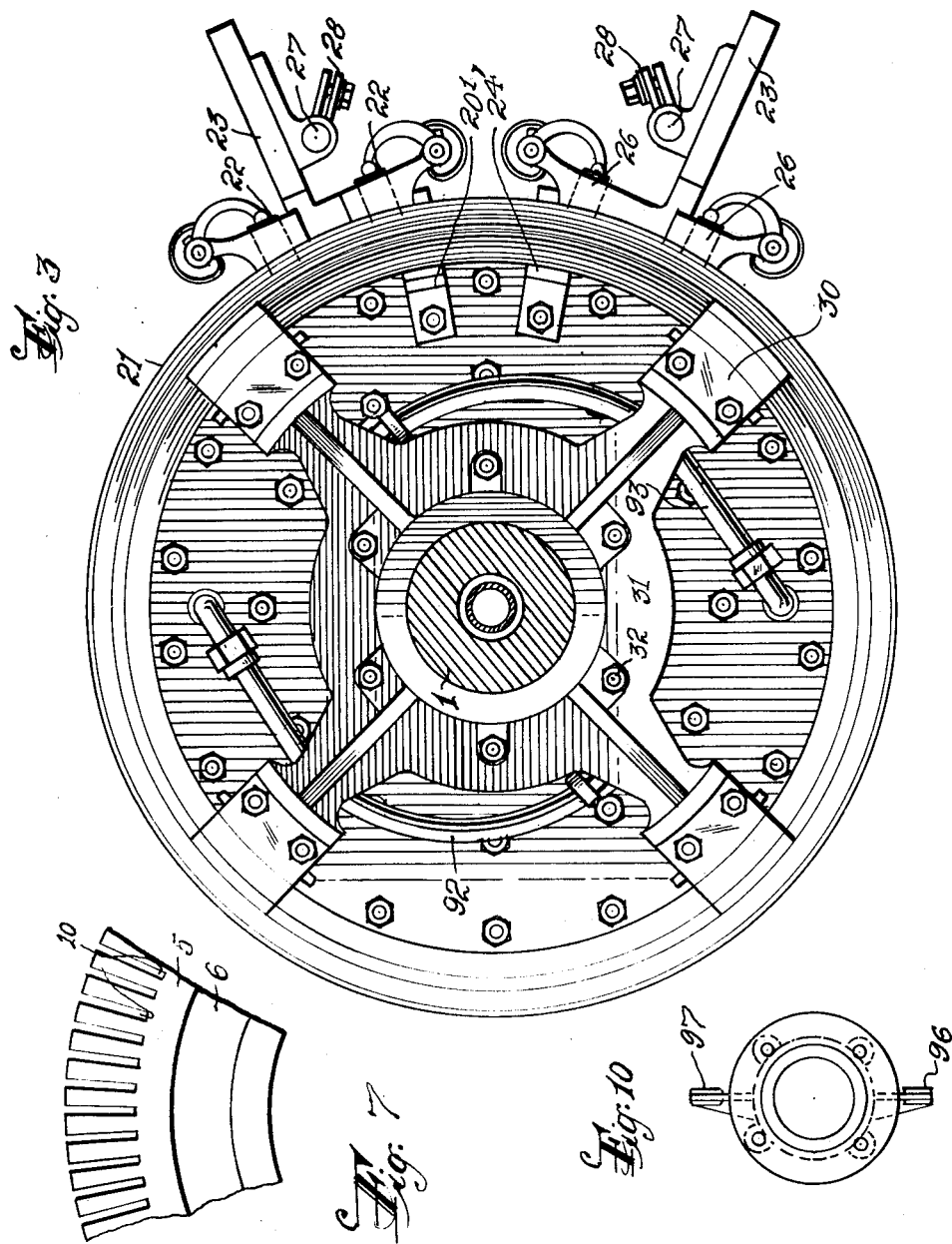
Inventor
Thomas M. Hunter
By A. D. T. Libby
Attorney.

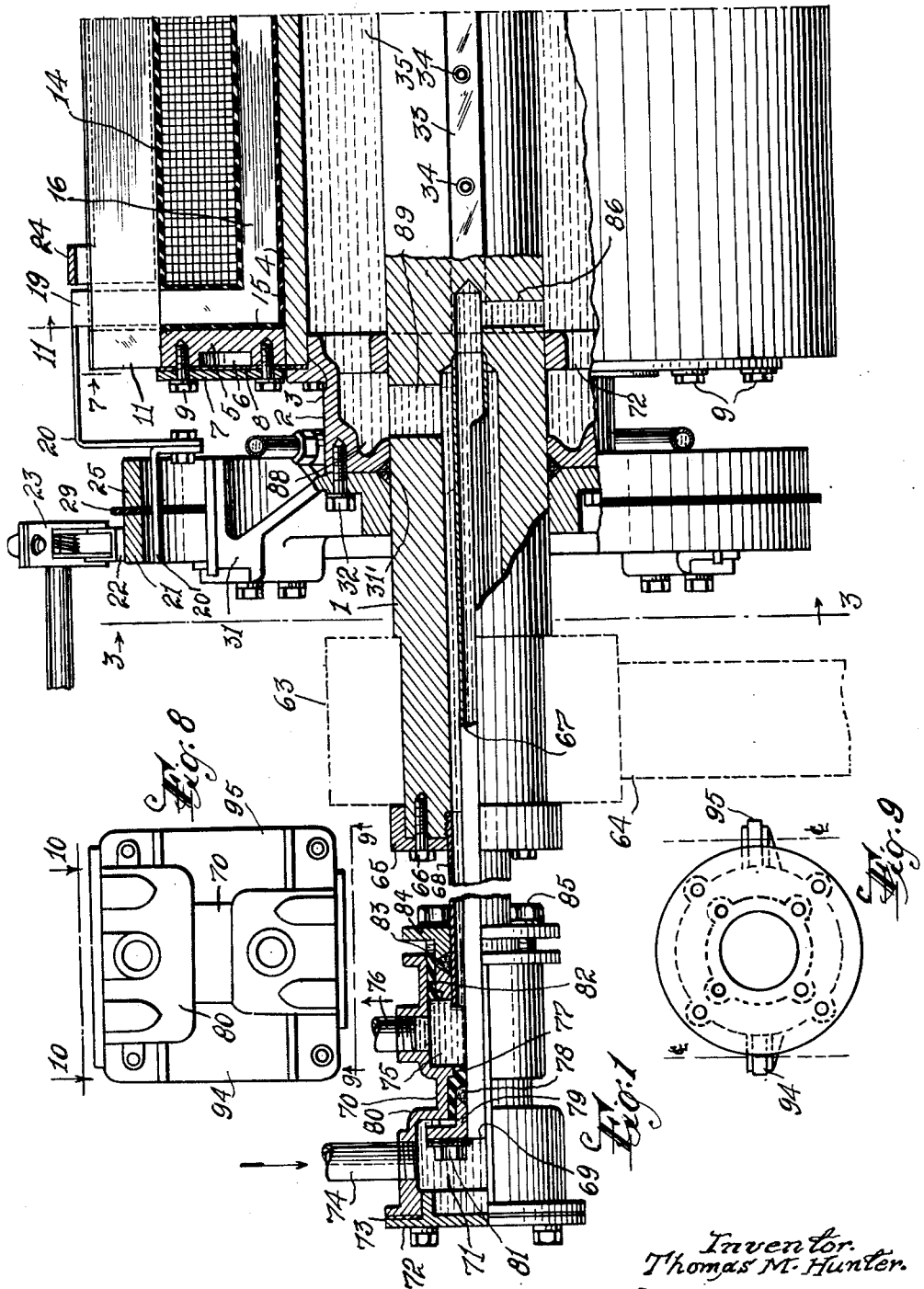

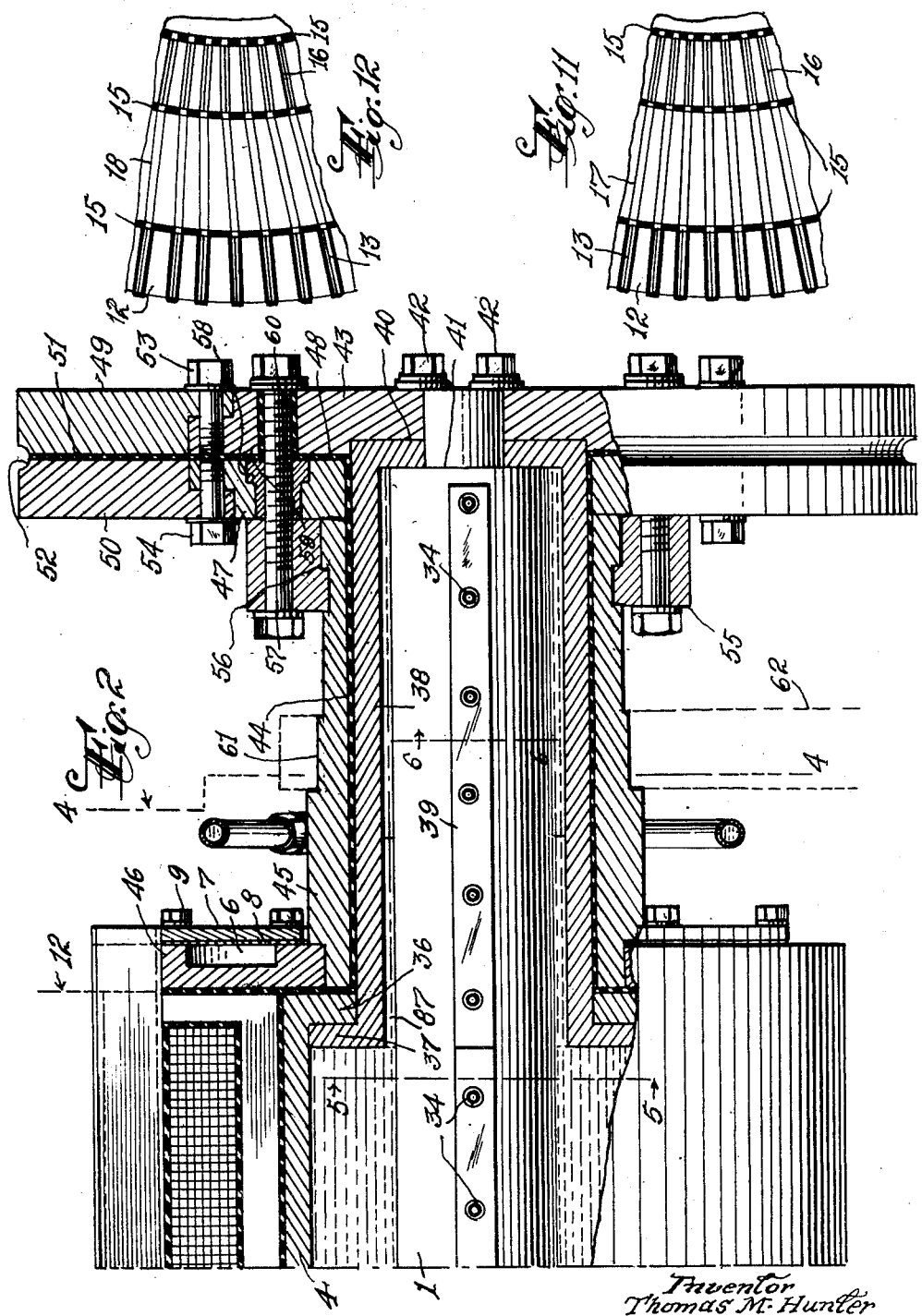

May 6, 1941.　　　　T. M. HUNTER　　　　2,241,015
ROTARY WELDING TRANSFORMER
Filed May 17, 1939　　　　4 Sheets-Sheet 4
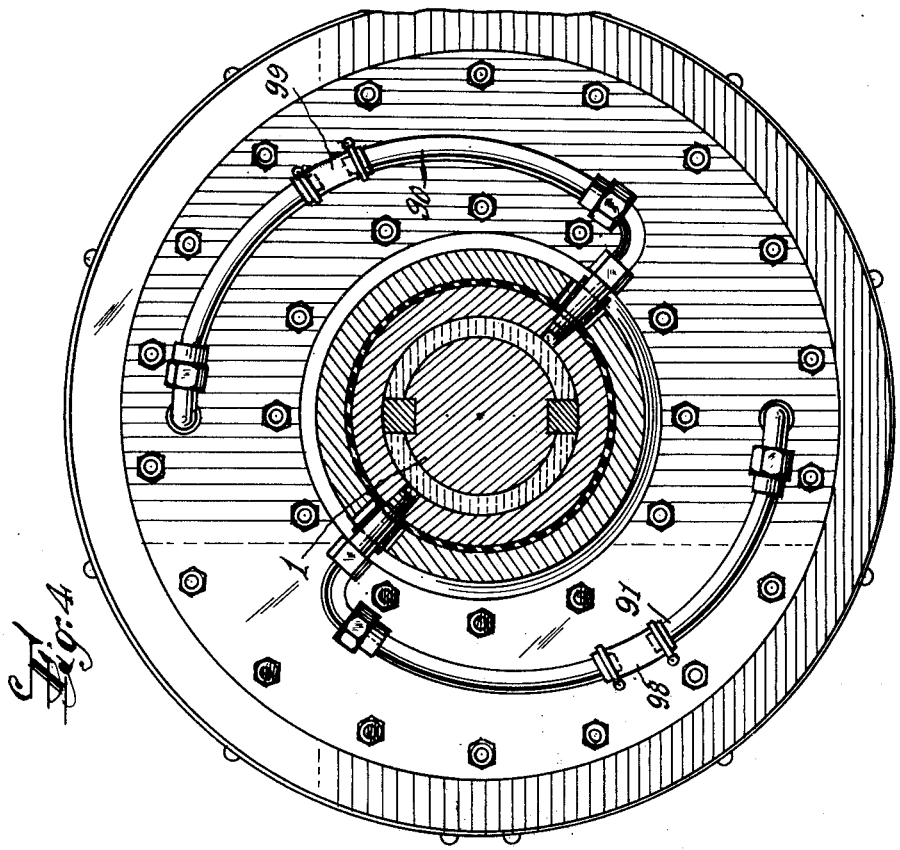
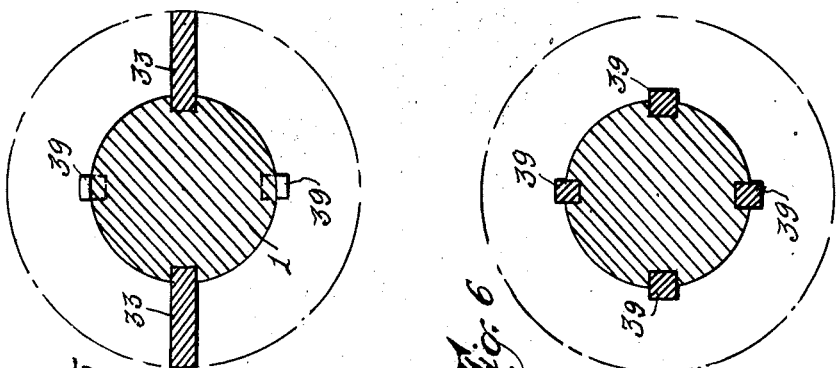
Inventor:
Thomas M. Hunter
By A. D. T. Libby
Attorney Patented May 6, 1941

2,241,015

UNITED STATES PATENT OFFICE 2,241,015

ROTARY WELDING TRANSFORMER

Thomas M. Hunter, East Orange, N. J.

Application May 17, 1939, Serial No. 274,177

13 Claims. (Cl. 219—6)

This invention relates to improvements in a rotary welding transformer particularly designed for use in welding sheet metal or tubing in which a very heavy current at a low voltage is required.

In my Patent 1,811,886, issued June 30, 1931, I have shown and described a very efficient form of rotary welding transformer. However, the present application is directed to several improvements thereover which will be pointed out in the following description, taken in connection with the annexed drawings, wherein:

Figure 1 is a view, partly in section and partly in elevation, of one end of my new rotary welding transformer.

Figure 2 is a continuation of Figure 1, showing the opposite end of the apparatus.

Figure 3 is a view of the primary end of the transformer on the line 3—3 of Figure 1.

Figure 4 is a view on the line 4—4 of Figure 2.

Figure 5 is a sectional view on the line 5—5 of Figure 2.

Figure 6 is a view on the line 6—6 of Figure 2.

Figure 7 is a fragmentary view on the line 7—7 of Figure 1 of the connecting disc only.

Figure 8 is a plan view of the stuffing box per se shown at the left-hand end of Figure 1 and used for passing cooling fluid to the transformer.

Figure 9 is a view on the line 9—9 of Figure 8.

Figure 10 is a view on the line 10—10 of Figure 8.

Figure 11 is a view about on the line 11—11 of Figure 1, showing the arrangement of the primary conductors around the core, without the secondary conductors in place.

Figure 12 is a view about on the line 12—12 of Figure 2, showing the arrangement of the primary conductors at this end of the machine, without the secondary conductors in place.

In the various views, wherein like numbers refer to corresponding parts, 1 is a shaft to which is fastened a tube support member 2 which has an annular flange 3 on which rests one end of a tubular member 4 of good conducting material such as copper. Fastened to the tube support member end of the tube 4, as by welding or brazing, is a circular disc 5. The disc 5 is provided with an annular recess 6 which forms a chamber for cooling fluid. The chamber 6 is closed by a plate 7 and a gasket 8, the two being held to the disc 5 by screw-studs 9. The outer periphery of the disc 5 is slotted at 10 to receive the ends of the outer secondary bars 11 which are interspersed or intermingled in the spaces 12 between the primary conductors 13 which are arcuately spaced around the core 14.

The core 14 is preferably made up of a single strip of transformer steel of suitable width and thickness. By way of illustration, I prefer to use about a #29 U. S. gauge. The core 14 is insulated by suitable insulators 15 from the inner turns 16 of the primary winding. As shown in Figure 11, the end connectors 17 of the primary winding are substantially straight, while, to get the spacing at the opposite end of the core, the cross-connectors 18 at this end are formed about as shown in Figure 12. The beginning of the primary winding is indicated by a riser 19 which is connected through a lead 20 and connector 20' to a slip ring 21, on which one or more brushes 22, carried by brush holders 23, are located.

The end of the primary winding is indicated by a conductor 24 which is connected in a similar manner as described with respect to the conductor 19, to the slip ring 25 through a connector 24' and has one or more brushes 26, two being indicated in Figure 3. The brushes 26 are carried in the same type of holder 23 as are the brushes 22. Each of the brush holders 23 is provided with an orifice 27 to receive a support member for carrying the brush holder which is clamped in place by a clamping means 28. The slip rings 21 and 25 are insulated from each other in any satisfactory manner as by an insulator 29, and are insulatingly supported on a plurality of arms 30 forming part of a spider 31. The spider 31 is fastened to the support member 2 in any satisfactory manner as by screw studs 32.

The inner secondary, which includes the tubular conductor 4, is spaced from the shaft 1 by a suitable number of keys 33, two being indicated in Figure 5. The keys are fastened to the shaft 1 as by screws 34, the heads of which come flush with the outer edge of the keys 33 so that the tube 4 will rest evenly and smoothly on the keys. The width of the keys 33 is such as to leave a substantial chamber 35 for cooling fluid, to which reference will be later made.

As shown, the end of the tubular member 4, opposite the support 2, is provided with an inturned flange 36 which is welded or brazed to an outwardly turned flange 37 on a tubular member 38 of conducting material such as copper, which is supported on a plurality of keys 39, four being indicated in Figure 6, and held to the shaft by screws 34 used in holding the keys 33 to the shaft. The outer end of the tubular member 38 has an inturned portion or flange 40 which extends down over a flanged end portion 41 of the shaft and is fastened to the shaft by a plurality of studs 42 which also act to fasten the electrode plate 43 to the tubular member 38 and the shaft 1. The tubular members 4 and 38 may be made in one piece, if preferred, cost, convenience of assembly and efficiency being controlling factors.

Positioned over the outer periphery of the tubular member 38 is an insulator 44 and on this is carried a tubular member 45 of good conducting material such as copper. The core end of the tubular member 45 is welded or brazed to a disc 46 of good conducting material, such as copper, which is nearly a duplicate of the disc 5 shown in Figure 7. The disc 46 has a cooling chamber 6 formed by a plate 7 and gasket 8, the two being held by studs 9, the same as has been described with respect to the disc 5.

The outer end of the tubular member 45 carries an electrode 47 of good conducting material, being separated from the electrode 43 by suitable insulating material 48. I prefer to mount on the outer periphery of the electrodes 43 and 47, welding shoes 49 and 50, the same being separated by a space or suitable insulator 51 extending to the electrodes 43 and 47, and each provided with a cutout portion to form a suitable groove 52 for the tube that is to be welded. The shoes 49 and 50 may be made in suitable arcuate sections or as complete rings, and are fastened to the electrodes 43 and 47 in any satisfactory manner as by a plurality of studs 53 and 54 which bolt the flanged portions of the shoes 49 and 50 to their respective electrodes 43 and 47. These shouldered portions prevent the shoes 49 and 50 from contacting when an air gap is used between them in place of an insulator such as shown at 51.

To further assist in holding the electrodes 43 and 47 in position, I provide a clamping member 55 made in two arcuate sections to go around the periphery of the member 45. The members 55 have shouldered portions 56 to engage cooperative recesses in the member 45. The edge surfaces of the members 55 engage the electrode 47 and are held in clamping position by bolts 57 which are insulated from the electrode 43 by insulators 59 and 60. A shouldered bushing 58 is used for each of the studs 57 and set into the electrode 47. The bushing 58 is internally threaded so that the screw stud 57 may draw the members 55, which are of good conducting material such as copper, securely against the electrode 47, also of copper. If the threads were directly in the member 47 there would be danger of stripping them, so the bushing 58 is made of much harder material. Since the insulator 48 might give way slightly under the heat and pressure to which the welding rolls are subjected, any looseness between the members 55 and the electrode 47 would be very detrimental to the action of the machine. Hence the construction just described is preferred, which eliminates any chance of loosening between these parts. Thus a good electrical connection is completed from the secondary disc 46 through the member 45 and to the electrode ring 47. The member 45 has a bearing surface 61 for a suitable type of bearing carried by a support member 62. The other bearing member 63 is indicated in broken lines at the opposite end of the machine, being carried by a support member 64, the bearing member 63 being held in place on the shaft 1 by a suitable collar 65 held to the shaft by a screw 66.

By positioning and welding electrodes outside of the bearing support 62, I have made them accessible, so that as the shoes 49 and 50, or complete rings, wear, they may, on account of their accessibility, be quickly replaced or changed for shoes or rings having a different size groove to fit tubes to take different sizes of pipe. Where the welding electrodes or rings are mounted between the bearings, as in my patent previously referred to, considerably more time is consumed and hence loss in production is entailed, so that the present construction herein described, of mounting the electrodes and shoes outside the bearings, is a decided improvement. Furthermore, this positioning of the welding electrodes separates the parts in which heat is generated to such an extent that cooling chambers are not required in the welding electrodes per se.

In order to carry cooling fluid, such as water, to the interior of the transformer, I have provided two pipes 67 and 68 which extend into the hollow end of the shaft 1. The inner pipe 67 terminates at the point 69 in a stuffing gland 70 and opens into a chamber 71, the end of which is closed by a suitable plate 72 and gasket 73, an inlet pipe 74 leading into the chamber 71 for conducting cooling fluid thereinto. The outer pipe 68 terminates in a chamber 75 into which an outlet pipe 76 extends. The chambers 71 and 75 are separated by an insulator 77 and a stuffing gasket 78 held in position by a flanged collar 79 that is fastened to the shouldered portion 80 of the stuffing gland 70 by studs 81 which are insulated from the collar 79, thereby keeping the inner pipe 67 insulated from the stuffing gland 70, except for the cooling fluid. The pipe 68 is likewise insulated from the stuffing box by an insulator 82 and stuffing gasket 83 which is engaged by a flanged member 84 held in place by insulated studs 85.

The cooling fluid, such as water, coming through the pipe 74 into the chamber 71, passes through the pipe 67 and through an orifice 86 into the chamber 35 inside the core and primary winding. The fluid will pass through half of the chamber 35 on one side of the keys 33 and into certain of the spaces 87 formed by the keys 39, and then out of these chambers through orifices 88 in the support member 2 and through one or more passages 89 into the space between the pipe 67 and the inner wall of the shaft 1, and then through the pipe 68 back to the chamber 75 and out the outlet pipe 76. The chambers 6 in the discs 5 and 46 are connected to these inner chambers and passages by means of the tubular connectors 90, 91, 92 and 93, as will be seen from Figures 1, 2, 3 and 4, without further detail explanation, except that 90 and 91 are each split by insulators 98 and 99 which may be in the form of pieces of rubber hose to prevent short-circuiting the secondary ends.

The stuffing box 70 is provided at one end with ears 94 and 95, and ears 96 and 97 at the opposite end, which ears serve to attach support members thereto for holding and supporting the stuffing box 70 in proper alignment with the shaft 1.

It is to be understood that the transformer is rotated by the tangential pressure exerted on the periphery of the welding rings or shoes by the passage in the groove 52 of the tube being welded. If any additional turning effort is required the shaft end at 41 may be extended to apply a pulley or gear thereto, but this will in no way interfere with the accessibility of the welding rolls or shoes. The feed rolls for the tube and apparatus for forming and driving the tube are not shown as they form no part of my transformer per se.

It has been heretofore mentioned that the welding electrodes, because of their location, are not equipped with cooling chambers, but by reason of their position outside the bearing, cooling fluid such as water can be sprayed onto the welding wheels, if necessary, without detrimental effect on any other parts of the machine.

While certain of the details entering into the construction of the rotary transformer herein described may be varied, the features over my prior patents relating to this art are set forth in the appended claims.

What I claim is:

1. In a rotary welding transformer; including a shaft, an annular core, a primary winding looped around the core with means for conveying current to said winding, a secondary winding including two discs one on each side of the core with outer conductors intermingled with the outerparts of the primary turns and connected to the outer portions of said discs; a tubular member between the core and shaft and electrically connected at one end to one of said discs and having an extension projecting a substantial distance beyond that end of the core opposite to the disc to which the tubular member is connected, the extension terminating in an inturned flange engaging the shaft, a second tubular member insulatingly carried by and radially outside of said extension and having one end connected to the other of said discs, a bearing member carried by said second tubular member between the disc and its other end, a wheel having one part carried by the shaft and at least directly in contact with said inturned flange of the first-mentioned tubular member, the wheel having another part carried by said tubular member extension but insulated therefrom and connected to the second-mentioned tubular member, said wheel parts having opposed electrodes insulated one from the other.

2. A rotary seam welding transformer including a shaft, an annular core, a primary winding looped around the core with means for conveying current to said winding, a secondary winding; including two discs one on each side of the core and outer conductors intermingled with the outer parts of the primary turns and connected to the outer portions of said discs and a tubular member between the core and shaft and fastened at one end to one of said discs and having a flange at its opposite end, a second tubular member in axial alignment with the first and having flanges at both ends, the one on its inner end being interlocked with and fastened to the flange on the first tubular member, while the flange on its outer end passes over a part of the shaft, a wheel having an electrode fastened to said last-mentioned flange and to the shaft, a third tubular member positioned over but insulated from the second tubular member, a second wheel electrode insulated from the first and connected to the other of said discs by said third tubular member, and a bearing member carried by said third tubular member between the disc and wheel electrode which it interconnects.

3. A rotary welding transformer as defined in claim 1, further characterized in that the first-mentioned tubular member and its extension are spaced from the shaft to form a main cooling chamber within the inner confines of the core and windings, the part of the first-mentioned tubular member directly under the core being spaced a greater distance from the shaft than its extension so that part of the cooling chamber directly within the confines of the core is of greater diameter and capacity than the balance of the chamber and the bearing is brought close to the shaft, and means for passing a cooling fluid through the entire chamber.

4. A rotary welding transformer as defined in claim 1, further characterized in that the first-mentioned tubular member and its extension are spaced from the shaft by support keys fastened to the shaft in arcuately spaced relation to form a subdivided cooling chamber within the inner confines of the core and windings, the keys between the shaft and that part of the first-mentioned tubular member within the core being wider than the other keys holding the extension, thereby forming that part of the chamber within the core of greater capacity, and means for passing a cooling fluid through the subdivision of said chamber.

5. A rotary seam welding transformer including a shaft, an annular core, a primary winding looped around the core with means for conveying current to said winding, a secondary winding; including two discs one on each side of the core and outer conductors intermingled with the outer parts of the primary turns and connected to the outer portions of said discs, a support member fastened to the shaft and supporting one of said discs, a tubular conducting member also supported at one end on said support member and fastened at least to said disc and extending through the core and insulatingly supporting the inner turns of the primary winding and the core, another tubular member mounted on the shaft in axial alignment with the first tube and anchored thereto, support keys fastened to the shaft and extending between it and said tubular members, a third tubular member insulatingly mounted on the second tubular member and fastened at one end to the second disc, and a wheel having opposed electrodes insulated one from the other and connected one each to the outer extremity of the second and third tubular members.

6. A rotary welding transformer as set forth in claim 5, further defined in that the shaft is hollow and has an inlet and outlet cooling fluid pipe entering thereinto, the said support member having a chamber therein opening into the space between the shaft and the tubular member due to the use of said keys, and also into said pipes to pass cooling fluid to and from said space within the transformer.

7. A rotary welding transformer as set forth in claim 5, further defined in that the third tubular member carries a bearing member for the transformer intermediate its ends.

8. A rotary seam welding transformer including a shaft, an annular core, a primary winding looped around the core with means for conveying current to said winding, a secondary winding; including outer bars intermingled with the outer primary turns, a tube comprising the inner part of the secondary, and having an extension reaching to a point adjacent one end of the shaft, a tubular member over said extension but insulated therefrom, means at each side of the core for completing a connection between the outer secondary bars and said tube and tubular member, a wheel having opposed electrodes connected to said tubular member and tube extension and bearings for the transformer, one bearing being carried on said tubular member between the welding wheel and the core.

9. A rotary welding transformer including a shaft, an annular core, a primary winding around the core with means for conveying current to said winding, a secondary winding around the core, bearings for rotatably supporting the transformer at points on opposite sides of the core, the shaft extending through one of said bearings, and a welding wheel having opposed electrodes carried on the shaft extension and connected to the ends of the secondary winding.

10. A rotary welding transformer including a hollow shaft, an annular core, a primary winding around the core with means for conveying current to said winding, a secondary winding around the core, bearings for rotatably supporting the transformer at points on opposite sides of the core, the shaft extending through one of said bearings, a welding wheel having opposed electrodes carried on the shaft extension and connected to the ends of the secondary winding, said core and winding being spaced a substantial distance from the shaft to form a large interior cooling chamber, two pipes extending into the hollow end of the shaft and fastened to rotate therewith, connections between the inner ends of said pipes and said cooling chamber, a stuffing box having fluid inlet and outlet portions, and means for insulatingly mounting the stuffing box on said two pipes so each pipe is in rotatable communication with its portion of the box, and means on the stuffing box for attaching supporting means thereto.

11. A rotary welding transformer as set forth in claim 5, further defined in that the means for conveying current to the primary winding includes, a spider fastened to said support, a pair of slip rings insulatingly mounted on the spider, one ring being connected to the beginning of the primary winding and the other ring to the end of the primary winding, and brushes carried in holders for conveying current to said rings.

12. A rotary welding transformer as set forth in claim 8, further defined in that said tubular member has an annular shoulder to receive clamping members and one wheel electrode has shouldered and threaded inserts therein to receive threaded bolts which pass through them and the clamping members as well as the other electrode from which they are insulated, with nuts on the bolts for clamping the said parts securely together.

13. A welding transformer including a shaft, a secondary winding relatively fixed upon the shaft for coincident rotation therewith, a primary winding coupled to said secondary winding, bearings for rotatably supporting the shaft at points on opposite sides of the windings, the shaft extending through one of the bearings, and two disc electrodes carried on the shaft extension and electrically connected to the ends of the secondary winding.

THOMAS M. HUNTER.